United States Patent [19]

Martin

[11] Patent Number: 4,927,500
[45] Date of Patent: May 22, 1990

[54] WASTE OIL PURIFYING APPARATUS

[75] Inventor: Charles K. Martin, Boonton, N.J.

[73] Assignee: Infern-O-Therm, Keyport, N.J.

[21] Appl. No.: 764,962

[22] Filed: Aug. 12, 1985

Related U.S. Application Data

[63] Continuation of Ser. No. 537,278, Sep. 29, 1983, abandoned.

[51] Int. Cl.$^5$ .................... B01D 1/02; C10G 1/02
[52] U.S. Cl. .......................... 196/46; 196/108; 196/117; 196/134
[58] Field of Search ............. 196/46, 109, 116, 117, 196/120, 134, 107, 108; 201/29, 27; 208/187

[56] References Cited

U.S. PATENT DOCUMENTS

| | | | |
|---|---|---|---|
| 1,652,167 | 1/1918 | Dubbs | 196/109 |
| 1,757,596 | 5/1930 | Slagter | 196/127 |
| 1,987,175 | 1/1935 | Benjamin | 196/46.1 |
| 1,993,344 | 3/1935 | Jacobson | 196/117 |
| 2,319,598 | 5/1943 | Harris | 196/46 |
| 2,372,591 | 3/1945 | Lonngren | 196/127 |
| 2,430,344 | 11/1947 | Kemp | 196/116 |
| 3,565,791 | 2/1971 | Urquhart et al. | 196/46 |
| 3,759,795 | 9/1973 | Oliver et al. | 201/27 |
| 4,069,024 | 1/1978 | Fernandes | 48/197 R |

*Primary Examiner*—Joye L. Woodard
*Attorney, Agent, or Firm*—Frishauf, Holtz, Goodman & Woodward

[57] ABSTRACT

A finished oil product is recovered from crude or waste oil contaminated with water and the like by heating the waste oil in a tank with a heating flame which may be gas or oil fired. The waste oil is heated until vapors including light ends and the desired finished oil product are produced from the waste oil within the tank. The vapors are introduced into the heating flame so that additional heat is developed by such afterburning to heat the waste oil in the tank. The finished oil product as recovered from the waste oil is discharged from the tank by a suitable outlet pipe arrangement.

12 Claims, 4 Drawing Sheets

WASTE OIL PURIFYING APPARATUS

This application is a continuation of application Ser. No. 537,278, filed 9/29/83, now abandoned.

BACKGROUND OF THE INVENTION

The present invention relates to a process for recovering a finished oil product from contaminated or crude waste oils, and apparatus for carrying out the process. In particular, the present process calls for introducing vapors which are produced from heating of the waste oil in a tank by a gas or oil fired flame, back into the flame so that light ends included in the vapors are combusted by the flame to provide additional heat for heating the waste oil in the tank. The present apparatus includes burner means for heating the waste oil in the tank, together with suitable afterburner means for combusting the vapors with the flame provided by the burner means.

It is known to recycle vapors produced when crude oil is heated by a furnace, back through a heat exchanger wherein the heat of the vapors is transferred to an incoming crude oil stream for purposes of preheating the stream. Such an arrangement is disclosed in U.S. Pat. No. 4,321,132 issued Mar. 23, 1982. In the system of the '132 patent, however, a main furnace-heater is provided for elevating the temperature of the crude oil stream to about 600° F., and a separate flash separator is provided for dividing the heated stream into a vapor portion is routed through a separate heat exchanger to preheat the incoming crude oil stream. From the heat exchanger, the vapor portion is then conducted to a fractionation column. U.S. Pat. No. 4,292,140, issued Sept. 29, 1981, relates to a distillation process in which heats of distillates and bottom products are recovered by heat exchangers so as to preheat a main feed, and the heat of the distillates is transferred to boiler water to generate steam. According to the patent, the steam can be used to atomize fuel which fires a heating furnace, and may also be injected into the main feed line in the heating furnace to increase the flow of feed charged into the distillation column.

The known conventional waste oil recovery processes fail, however, to utilize efficiently all the heat which may be obtained from the vapors produced upon heating of the waste oil, for preheating or supplemental heating of the waste oil in a recovery system.

SUMMARY OF THE INVENTION

An object of the present invention is to overcome the above and other shortcomings in the known prior waste oil recovery or purifying processes and systems.

Another object of the invention is to provide for the combustion of vapors produced during heating of waste oil to be recovered, to provide an additional measure of heat to the waste oil.

Another object of the invention is to provide for the combustion of vapors produced during heat of waste oil to be recovered, wherein the vapors are introduced into a flame provided by a burner which serves as a primary heating source for the waste oil.

Another object of the invention is to provide for the combustion of vapors produced upon heating of waste oil to be recovered, by introducing the vapors into a flame provided by a burner within a waste oil preheat tank, so as to provide an additional measure of preheating of the waste oil before the waste oil is further heated and recovered in a separate still tank.

According to the invention, a process for recovering a finished oil product from waste oil includes containing the waste oil in a tank, heating the waste oil with a heating flame until a desired finished product is produced in the tank together with vapors including light ends, introducing the vapors into the heating flame to provide additional heat to the waste oil, and discharging the finished product from the tank.

Apparatus according to the invention includes a tank for containing waste oil, burner means for heating the waste oil so that vapors and a desired finished product are produced from the waste oil, the burner means producing a flame which is fueled by an outside supply, afterburner means associated with the burner means for combusting the vapors produced in the tank to provide additional heat to the waste oil, and outlet means for discharging the finished product from the tank.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE INVENTION

Figure 1:
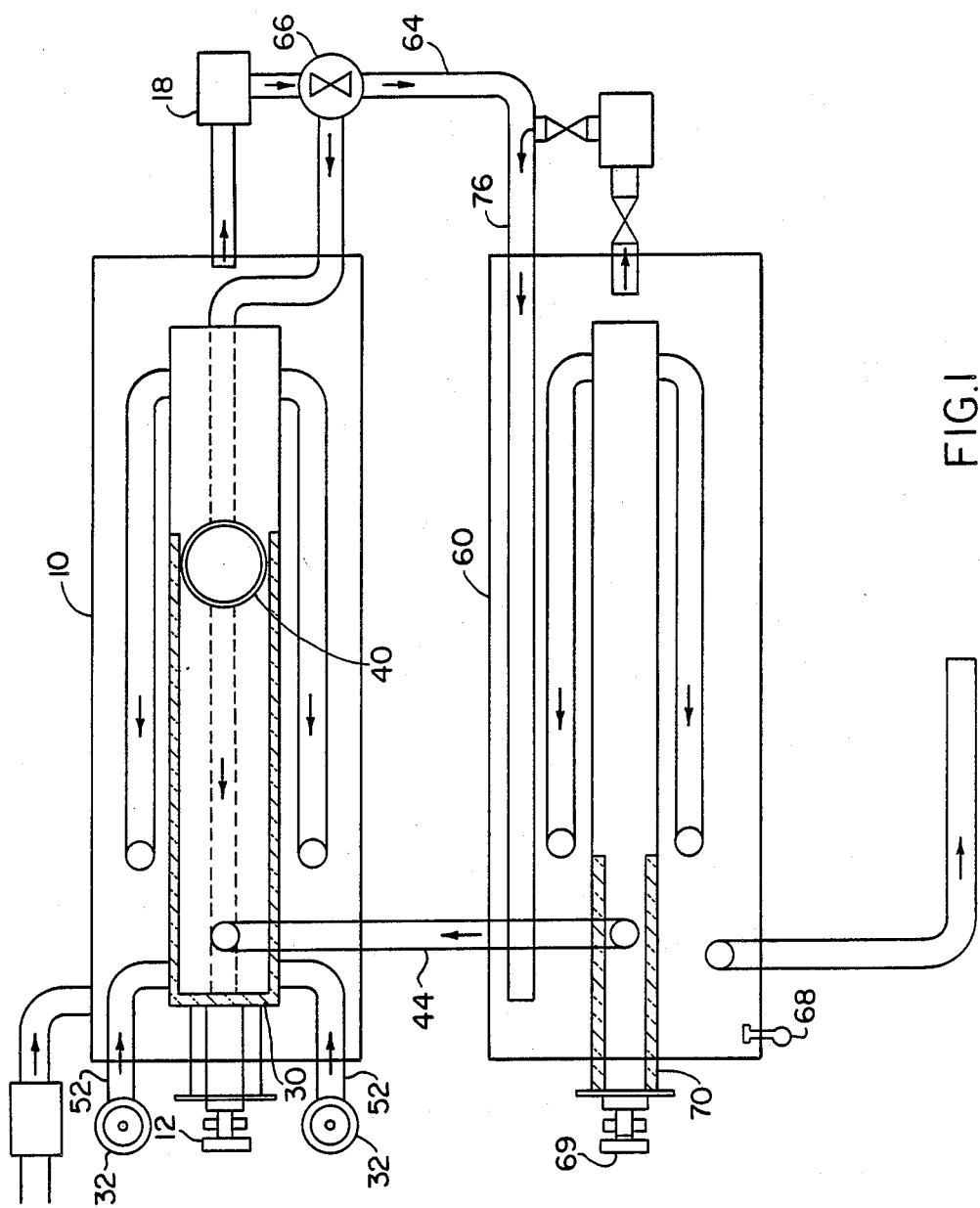
FIG. 1 is a schematic representation of a waste oil purifying process and apparatus according to the present invention.

FIG. 1 shows apparatus constructed and arranged to recover crude and waste oils which are contaminated with water and the like. Basically, a pre-heat tank 10 is provided for receiving the incoming crude or waste oil. The pre-heat tank 10 itself can be trailer mounted as shown in FIG. 4, and may typically comprise a 30,000 gallon, 10½ foot diameter tank with an associated burner 12 a part of which extends out from the lower rear end wall of the tank 10.

Figures 4A, 5:
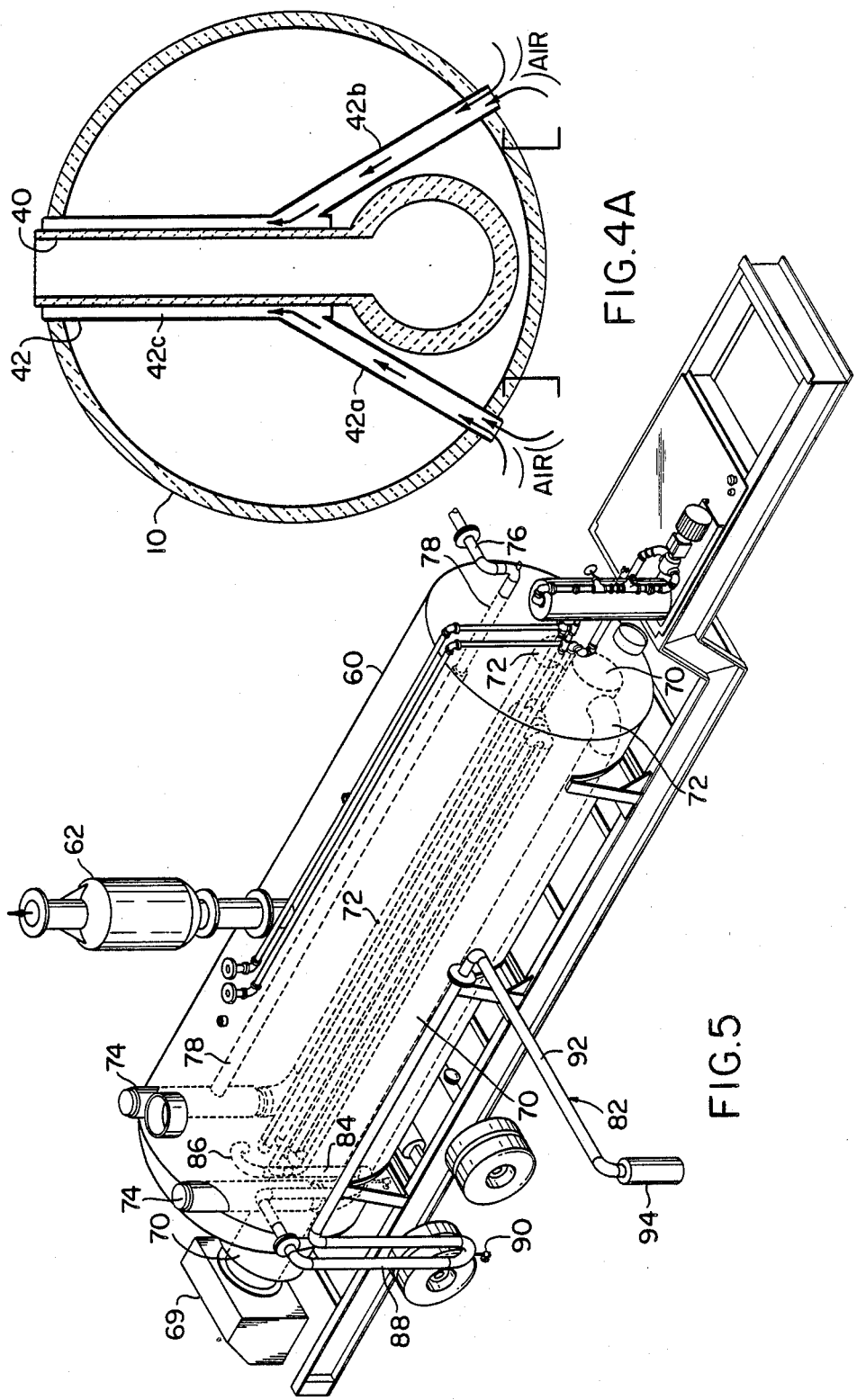
FIG. 4A is a simplified sectional view along line A—A in FIG. 4.
FIG. 5 is a perspective view of the still tank arranged as a mobile unit.
Figure 4:
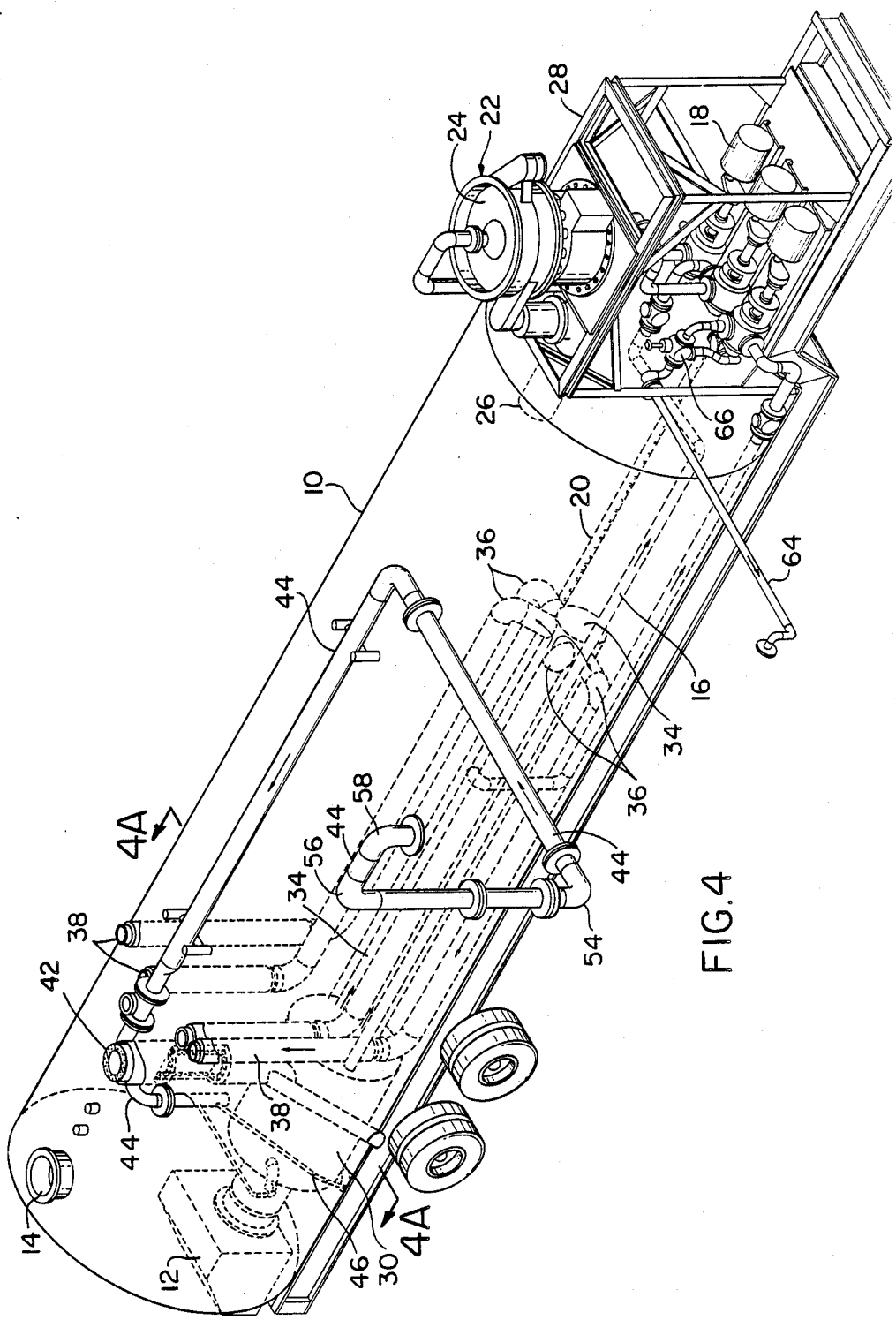
FIG. 4 is a perspective view of the waste oil preheat tank arranged as a mobile unit.

After cold crude or waste oil is filled into the tank 10 through a top opening 14, the cold waste oil is conducted through a suction line 16 which extends lengthwise along the bottom of the tank 10 to a circulation pump 18 as shown in FIG. 4. The pump 18 then forces the waste oil through a perforated spray bar or pipe 20 which also extends along the bottom of the tank 10 generally parallel to the suction pipe 16. The spray pipe 20 thus helps to circulate sediment and keep it in suspension so as to prevent the buildup of sediment at the bottom of the pre-heat tank 10. A shaker screen arrangement 22 at the top of the front end of the pre-heat tank 10 also may be provided as shown in FIG. 4, wherein a shaker screen 24 serves to separate solids from the liquid waste oil. A separator discharge pipe 26 conducts the screened waste oil back into the pre-heat 10. The shaker screen arrangement 22 is mounted on a frame 28 exterior of the pre-heat tank 10 at the front end wall of the tank 10 as shown in FIG. 4.

The pre-heat tank burner 12 can be, for example, a model 400 gas/oil burner manufactured by Infern-o-Therm Corporation of Keyport, New Jersey, together with a weatherproof burner enclosure attached to the lower portion of the tank rear end wall, as shown in FIG. 4.

Figure 2:
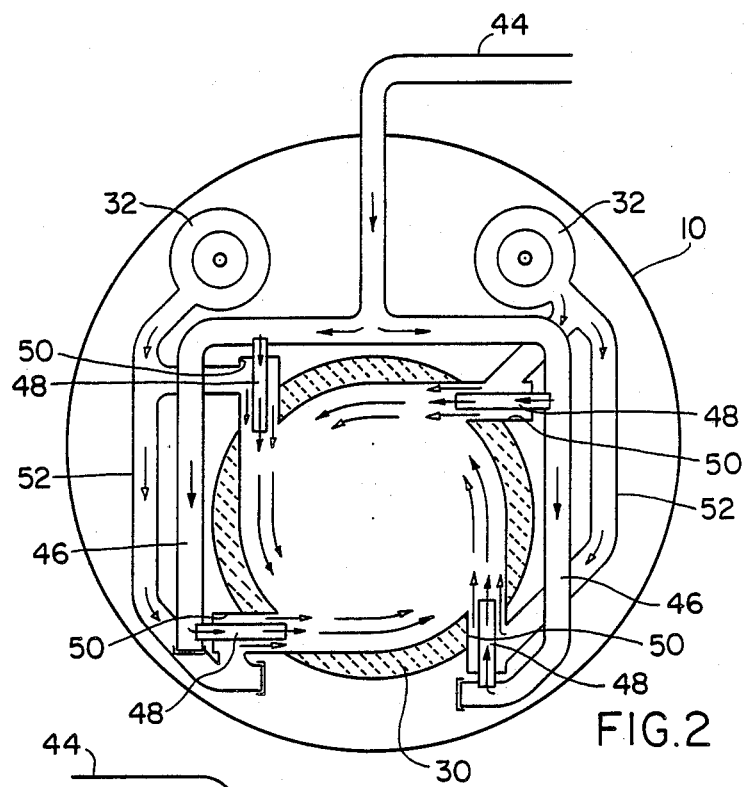
FIG. 2 is a sectional view through a preheat tank in FIG. 1, showing an arrangement for combusting waste oil vapors within a burner incineration chamber.

Associated with the pre-heat tank burner 12 is a generally cylindrical main incineration chamber 30 located in the lower rear portion of the pre-heat tank 10 and having its axis parallel to that of the tank 10. The incineration chamber 30 has a diameter of about 46 inches and is refractory lined. Combustion of a flame produced by the pre-heat tank burner 12 from an outside gas or oil supply occurs within the incineration chamber 30, together with combustion of waste oil vapors introduced into the incineration chamber 30 (see FIG. 2) as described further below. A pair of blowers 32 are arranged outside the pre-heat tank 10 as shown in FIG. 1, to direct combustion air through four secondary air inlets arranged tangentially relative to the inner circumference of the incineration chamber 30 as depicted in FIG. 2.

A 20 inch diameter primary heat transfer tube 34 extends from the end of the main incineration chamber 30 further from the burner 12, in heat exchange relation with surrounding waste oil contained in the pre-heat 10. Further, as shown in FIG. 4, a number of secondary heat transfer tubes 36, each of about 8 inch diameter, extend from the circumference of the heat transfer tube 34 at the forward end of the tube 34, wherein the secondary heat transfer tubes 36 bend at right angles to run parallel to the axis of the primary heat transfer 34 over a certain distance, and then bend again at right angles into associated stacks 38 which extend vertically through the top of the pre-heat tank 10, as shown in FIG. 4. The stacks 38 preferably are individually jacketed over their vertical lengths within the pre-heat tank 10.

A jacketed stack 40 extends vertically within the pre-heat 10 through a top opening in the circumference of the main incineration chamber 30 and out through the top of the pre-heat tank 10. The stack typically is of 20 inch diameter, refractory lined, and has a 26 inch surrounding jacket 42. The incineration chamber stack 40 preferably has a damper (not shown) mounted at the top of the stack, the damper being electrically controlled by a thermocouple so that when the temperature of the oil in the pre-heat tank 10 exceeds a certain level, e.g. 160° F., the damper will begin to open thus releasing heat from the incineration chamber 30. Such damper action will control the temperature in the pre-heat tank 10. As seen in FIG. 4A, hot exhaust from stack 40 causes fresh cooling air to flow in through pipes 42a, 42b and through annular space 42c to cool stack 40 and jacket 42 to prevent flash fires in the pre-heat tank 10.

A vapor pipeline 44 is arranged to extend partly along the top length of the pre-heat tank 10, as shown in FIG. 4, and to bend at one end to enter the pre-heat tank 10 and branch into separate interior vapor lines 46 in proximity to the outer circumference of the main incineration chamber 30, close to the end of the incineration chamber 30 which faces the burner 12. As shown in detail in FIG. 2, the vapor lines 46 have a total of four injection nozzles 48 each of which extend coaxially within an associated air intake passage 50. The air intake passages 50 communicate with a pair of air inlet ducts 52 each of which leads from a corresponding one of the two external air blowers 32. The four air intake passages 50 together with the injection nozzles 48 are equally circumferentially spaced every 90 degrees on the main incineration chamber 30, and operate to direct a mixture of waste oil vapor from the vapor return pipeline 44 and outside air supplied by the blowers 32 tangentially to the inner circumference of the main incineration chamber 30 in the same circumferential direction. The vapor and air mixture thus swirls against the heated inner refractory surface of the chamber 30. The arrangement of the injection nozzles 48 and air intake passages 50 provides for the afterburning of waste oil vapors supplied through the vapor pipeline 44, such vapors being produced when the waste oil is heated above a certain temperature either in a single tank, or in a separate still tank 60 as represented in FIG. 1 and shown in detail in FIG. 5.

It has been discovered that by providing four injection nozzles 48 within the associated air intake passages 50 in the manner disclosed in FIG. 2, a venturi of steam contained in the returned oil vapor as mixed with air supplied by the blowers 32 significantly influences the even distribution of gas and air within the incineration chamber 30. Light ends contained in the return vapors are combusted by the frame heat developed by the burner 12 in the main incineration chamber 30, and the injected steam and air mixture travels down past the main incineration chamber 30, through the primary heat transfer tube 34, and back through the secondary heat transfer tubes 36 and out of the stacks 38. Accordingly, heat obtained from the after burning of the waste oil vapors returned to the main incineration chamber 30, together with that provided by the burner 12, is transferred to the waste oil contained in the pre-heat tank 10.

The end of the vapor return pipeline 44 remote from the main incineration chamber 30 in the pre-heat tank 10, bends at a right angle transversely of the axis of the pre-heat tank 10 and extends a certain distance away from the tank 10 before assuming an upward right angle bend at 54 to rise a certain distance above the ground, and two further right angle bends at 56 and 58 so that the vapor return pipeline 44 opens downwardly to be coupled to a condensate tower 62 extending above the still tank 60 as shown in FIG. 5.

A waste oil supply pipe 64 also extends out and away from the pre-heat tank 10 for supplying the waste oil which has been heated in the pre-heat tank 10 above a certain temperature (e.g., 160° F.), to the still tank 60. The heated waste oil supply pipe 64 is coupled to the circulation pump 18 mounted at the forward end of the pre-heat tank 10 through a modulating valve 66 as shown in FIG. 4. The modulating valve 66 is controlled by a temperature probe 68 (FIG. 3) in contact with the waste oil delivered to and contained in the still tank 60. The modulating valve thus is controlled to maintain a certain degree of temperature of the oil in the still tank 60 so that a desired percentage of water will be present in the finished oil product. That is, the modulating valve 66 controls the supply of oil from the pre-heat tank 10 to the still tank 60 to maintain a predetermined temperature of the oil in the still tank 60 such as, for example, 250° F.

As shown in FIG. 5, and represented in FIG. 1, the still tank 60 comprises an elongate cylindrical tank, typically of 8 foot diameter and 10,000 gallon capacity. The still tank 60 can be trailer mounted as shown in FIG. 5 so that, together with the pre-heat tank 10 which also can be trailer mounted as shown in FIG. 4, the entire present waste oil purifying apparatus can be made mobile for use at any desired location.

The lower rear end portion of the still tank 60 is also fitted with a gas/oil burner such as the Infern-o-Therm model 400 provided on the pre-heat tank 10. The still tank burner 69 has an associated two-foot diameter heat transfer tube 70 which extends through the rear end wall of the still tank 60 and inside the tank 60 parallel to the tank axis over a certain length. At the end of the primary heat transfer tube 70 further from the burner 69, a pair of secondary heat transfer tubes 72 extend from the circumference of the tube 70 and bend at right angles to run a certain length back within the tank 60 toward the end of the tank closer to the burner 69. The secondary heat transfer tubes 72 then bend at right angles upward into a pair of jacketed stacks 74 which protrude from the rear top portion of the still tank 60 as shown in FIG. 5.

Figure 3:
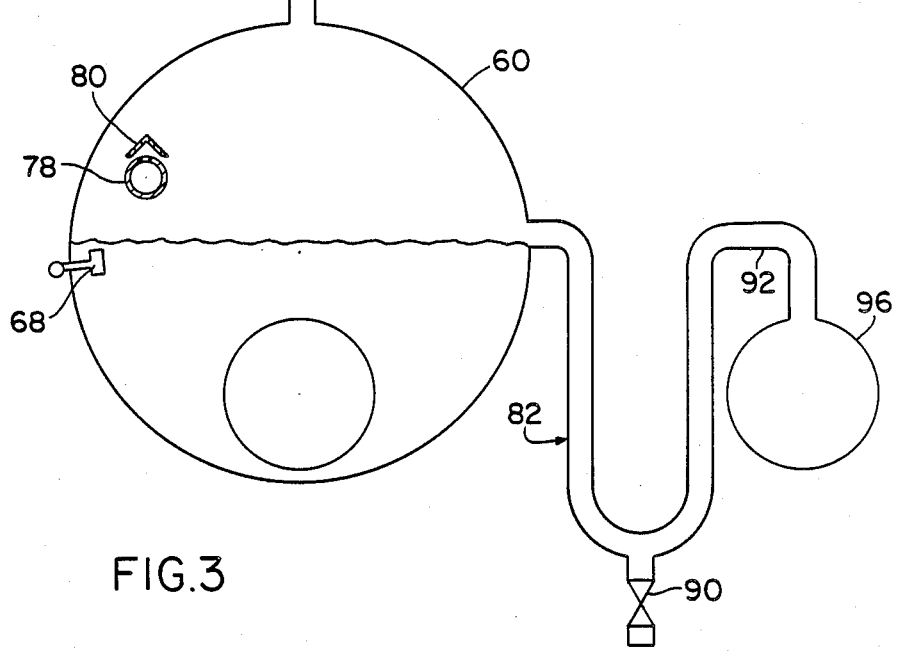
FIG. 3 is a sectional view through a still tank in FIG. 1, including a discharge pipe arrangement.

Heated waste oil pumped through the supply pipe 64 from the pre-heat tank 10 is introduced into the still tank 60 through a waste oil inlet pipe 76 at the forward end of the still tank 60. Inlet pipe 76 is coupled to a spray bar 78 which extends within the upper portion of the still tank 60, parallel to the tank axis (see FIGS. 3 and 5). As shown in FIG. 3, the spray bar 78 has perforations opening upwardly so that heated waste oil pumped into the spray bar 78 is directed through the perforations upwardly against an angle shield 80 (not shown in FIG. 5). The spray bar 78 is located in the still tank 60 so as always to be above liquid contained in the tank 60. Inasmuch as the still tank burner 69 is arranged to maintain an oil temperature in the still tank 60 of about 250° F., the incoming heated waste oil deflected off of the angle shield 80 will hit the hot surface of the oil in the still tank 60, and water vapor and light ends in the heated waste oil thus will be flashed off. The water vapor and light ends flashed off from the surface of the hot waste oil in the still tank 60, then rise through the condensate tower 62 atop the tank 60, to be conducted through the vapor return pipeline 44 of the pre-heat tank 10, the pipeline 44 being connected to the top of the condensate tower 62 when the pre-heat tank 10 and its associated piping is properly positioned relative to the still tank 60 with its appurtenant fixtures.

Preferably, the still tank 60 has its own re-circulating pump (not shown) for pulling off waste oil from the bottom of the tank 60 and re-circulating the pulled off oil into the spray bar pipe 78. Such arrangement also helps to raise the temperature of the oil in the still tank 60 thus aiding flash-off of the light-ends by re-circulating the oil which is heated to about 250° F.

The finished oil product is siphoned off the upper level of the heated oil in the still tank 60 by an outlet arrangement 82. The outlet arrangement 82 includes, within the still tank 60, an interior trap assembly 84 (FIG. 5) through which the oil product flows after it is drawn by an inverted U-tube 86. The siphon loop thus formed is located so that the oil level will rise about 10 inches above the top of the siphon loop, and will be drawn down to the bottom of the U-tube 86. Such arrangement allows for about a 14 inch draw down of finished product on each cycle.

An exterior trap assembly 88 has a drain and sampling valve 90 located at its bottom-most portion outside the still tank 60. The exterior trap assembly 88 leads into a finished product supply pipe 92 which is routed partway along the exterior length of the still tank 60 and then bent away from the tank 60 to an outlet nozzle 94 (FIG. 5) which may direct the finished product into a holding tank 96 as represented in FIG. 3.

The interior trap assembly 84 serves to prevent steam vapors from leaving the still tank 60 with the finished product.

As disclosed above, the present waste oil purifying apparatus is constructed and arranged to recover waste or crude oils contaminated with water and the like, wherein an after burner arrangement provided in a pre-heat tank burner combusts light end oils and incinerates steam vapor and odors at a temperature of approximately 1800° F., or more.

The pre-heat tank 10 receives incoming crude or waste oil, and the pre-heat tank burner 12 together with the afterburner arrangement in the main incineration chamber 30 of the burner 12, raises the temperature of the waste oil in the pre-heat tank 10. The heated waste oil is then pumped through the modulating valve 66 associated with the pre-heat tank 10, to the still tank 60. The temperature probe 68 in the still tank 60 controls the modulating valve 66 to maintain a desired temperature of the oil in the still tank of about 250° F., and thus to maintain a desired percentage of water in the finished product.

Heated waste oil entering the still tank 60 is directed through perforations in the spray bar 78 against the angle shield 80, to strike the surface of the hot oil in the still tank. The flashed off water vapor and light ends exit through the condensate tower 62 atop the still tank, and pass to the afterburner arrangement in the main incineration chamber 30 of the pre-heat tank, for combustion.

Once the still tank is brought up to the desired temperature, the flow rate of finished product obtainable, depending upon the percentage of water, may vary from between 1000 to 3000 gallons or more per hour.

Various modifications of the present apparatus and process will of course be apparent to those skilled in the art. For example, a second afterburner arrangement could be installed in the still tank 60 to operate together with the afterburner arrangement in the pre-heat tank 10, for combusting the waste oil vapors produced in the still tank. The temperature in the pre-heat tank then may be maintained at 215° to 220° F. The temperature in the still tank would be set to approximately 250° F. to obtain about one-half of 1% of water. The higher the still tank temperature, the drier the finished product.

On smaller installations, where no pre-heat tank is necessary, the present afterburner arrangement then would be provided directly in the still tank, and a relief stack with a damper would be used to control the heat rise in the still tank, and also be used on shut-down. The still tank then would have a pipe coil where cold oil from a storage tank would be pumped through to reduce the temperature of the still tank at shut-down.

The product supplied to the system generally has about 10% water content. Conventionally, this water would be distilled out. Disposal of the distilled-out water is very expensive. With the present invention, the water is effectively disposed of by "incineration" of the steam produced therefrom so that the resulting water content in the purified product is only about one-half of 18%. This is an industry-acceptable percentage of water in the resulting finished oil product.

While specific embodiments of the invention have been shown and described in detail to illustrate the application of the invention principles, it will be understood that the invention may be embodied otherwise without departing from such principles.

I claim:

1. Apparatus for recovering a finished oil product from crude or waste oil contaminated with water and the like, comprising:

a tank for receiving and containing a certain amount of waste oil, and including exhausting means for exhausting waste gasses from said tank;

burner means including a chamber inside said tank, for heating the waste oil contained in said tank to produce (i) waste gases including light ends from the waste oil in said tank, and (ii) a desired finished oil product from the waste oil in said tank, wherein said burner means is arranged to provide a heating flame to produce fire in said chamber, the waste oil being inside said tank and outside said chamber of said burner means so as to be isolated from direct contact with the flame of said burner means;

said waste gases being kept separate from combustion gas products produced by said burner means;

means for feeding back said waste gases from said exhausting means to said chamber;

afterburner means associated with said burner means and arranged inside of said tank and at least partly within said chamber, for combusting, inside said chamber, the fed back waste gases produced from the waste oil in said tank with the flame of said burner means to obtain additional heat from the combustion of the fed back waste gases for heating the waste oil contained in said tank;

means for exhausting said combustion gas products from said burner means;

outlet means coupled to said tank for discharging the finished oil product recovered from the waste oil in said tank.

2. Apparatus according to claim 1, wherein said chamber is an incineration chamber having an inner refractory surface for containing the flame provided by said burner means.

3. Apparatus according to claim 2, wherein said afterburner means includes blower means for directing a supply of air toward said incineration chamber.

4. Apparatus according to claim 3, wherein said afterburner means includes injection means on said incineration chamber and coupled to said blower means, for mixing the air supplied by said blower means with the waste oil vapors produced in said tank to obtain a vapor-air mixture, and for directing the vapor-air mixture to contact the inner refractory surface of said incineration chamber.

5. Apparatus according to claim 4, wherein said inner refractory surface is of generally cylindrical form, and said injection means comprises a plurality of injection nozzles in a plane perpendicular to the axis of said inner refractory surface and equally circumferentially spaced from one another for injecting the vapor-air mixture each in the same circumferential direction.

6. Apparatus according to claim 1, including means for controlling the temperature of the waste oil in the tank to obtain a desired water content in the finished oil product.

7. Apparatus for recovering a finished oil product from crude or waste oil contaminated with water and the like, comprising:

a pre-heat tank for receiving and containing a certain amount of waste oil to be recovered;

first burner means, including a chamber inside said pre-heat tank, for pre-heating the waste oil contained in said pre-heat tank, wherein said first burner means is arranged to provide a first heating flame in said chamber, the waste oil being outside said chamber of said first burner means and inside said pre-heat tank;

means for exhausting combustion gas products from said first burner means;

a still tank constructed separately from said pre-heat tank for receiving and containing a certain amount of pre-heated waste oil;

pre-heated oil supply means coupled between said pre-heat tank and said still tank for delivering pre-heated waste oil from said pre-heat tank to said still tank;

second burner means in said still tank for further heating the pre-heated waste oil contained in said still tank so that vapors including light ends and a desired finished oil product are produced from the waste oil, said vapors being kept separated from combustion gas products produced by said second burner means;

means for exhausting combustion gas products from said second burner means;

vapor return means coupled between said still tank and said pre-heat tank for returning said vapors produced in said still tank to said chamber in said pre-heat tank;

first afterburner means coupled with said first burner means of said pre-heat tank, and arranged inside of said pre-heat tank and at least partly within said chamber for combusting, inside said chamber, said vapors delivered by said vapor return means with the first heating flame of said first burner means to obtain additional heat from combustion of said vapors from said return means for pre-heating the waste oil contained in said pre-heat tank; and outlet means coupled to said still tank for discharging the finished oil product recovered from the waste oil in said still tank.

8. Apparatus according to claim 7, including means for maintaining the temperature of the waste oil in said still tank at a desired level.

9. Apparatus according to claim 8, wherein said temperature maintaining means includes a temperature probe below the oil level in said still tank, and a modulating valve forming a part of said pre-heated oil supply means for controlling the amount of waste oil delivered to said still tank from said pre-heat tank.

10. Apparatus according to claim 7, wherein said pre-heated oil supply means includes means for spraying the pre-heated waste oil over the surface of the waste oil contained in said still tank so that vapors including light ends are flashed off in said still tank.

11. Apparatus according to claim 10, wherein said means for spraying the pre-heated waste oil over the surface of the waste oil contained in said still tank comprises a spray bar.

12. Apparatus according to claim 7, including means for maintaining the temperature of the waste oil in said pre-heat tank at a desired level.

* * * * *